Aug. 29, 1939.　　　E. S. CORNELL, JR　　　2,170,810
MACHINE FOR FORMING COLD WROUGHT PRODUCTS
Filed Feb. 19, 1936　　　9 Sheets-Sheet 2
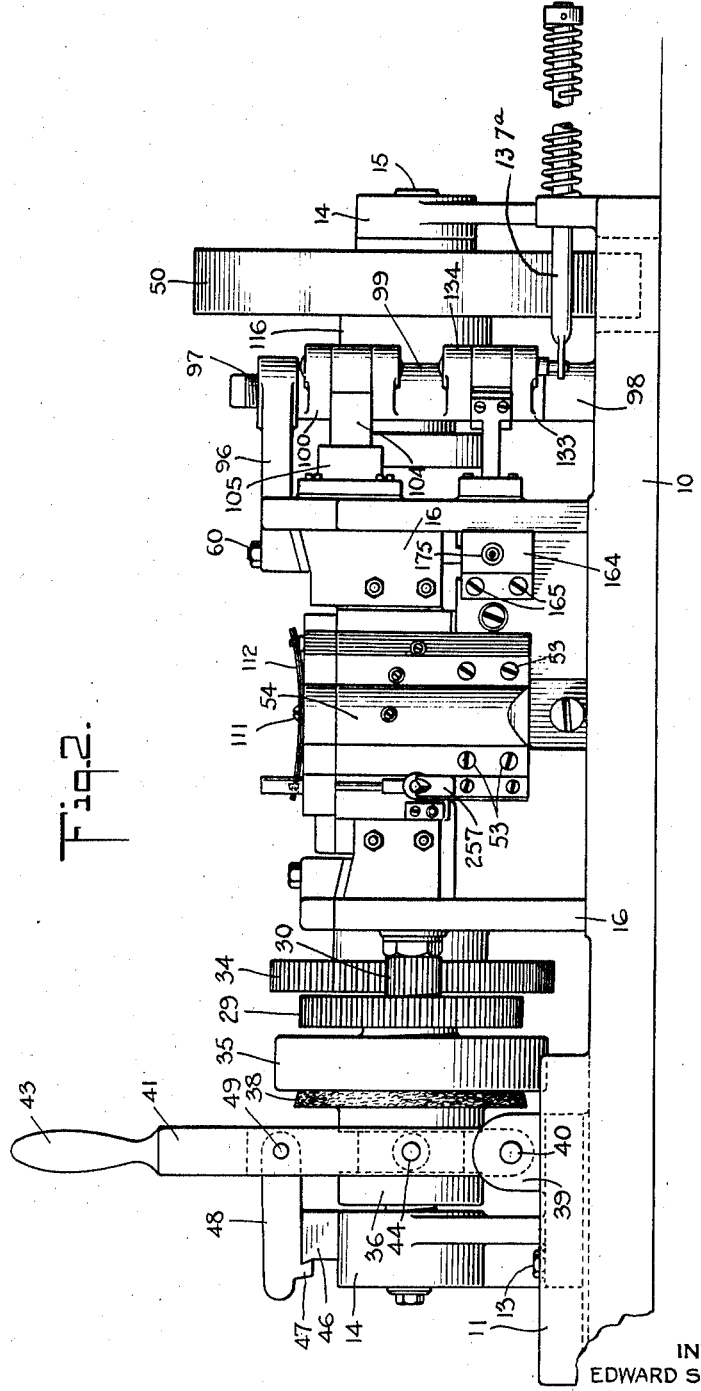
INVENTOR
EDWARD S. CORNELL, JR.
BY
HIS ATTORNEY

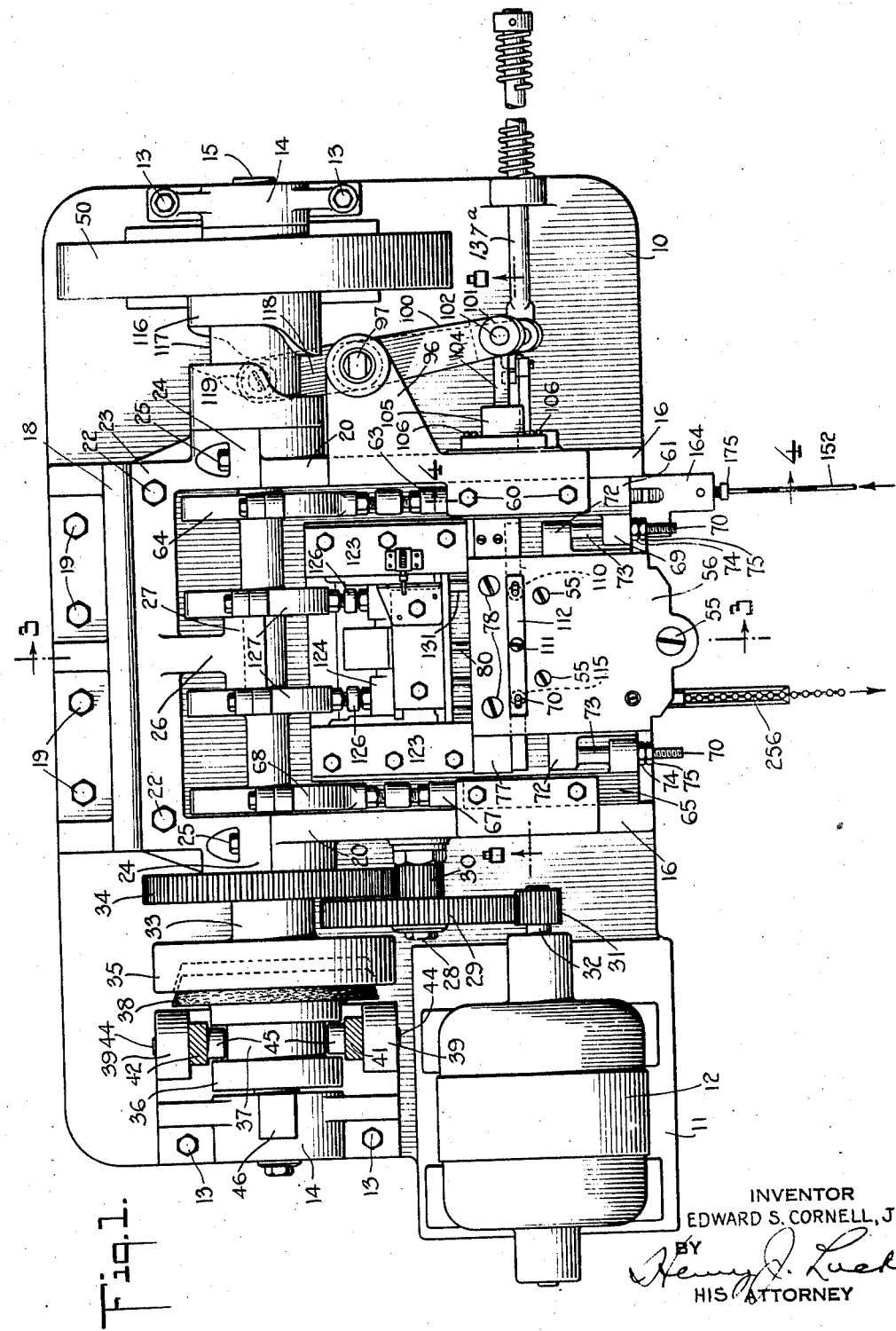

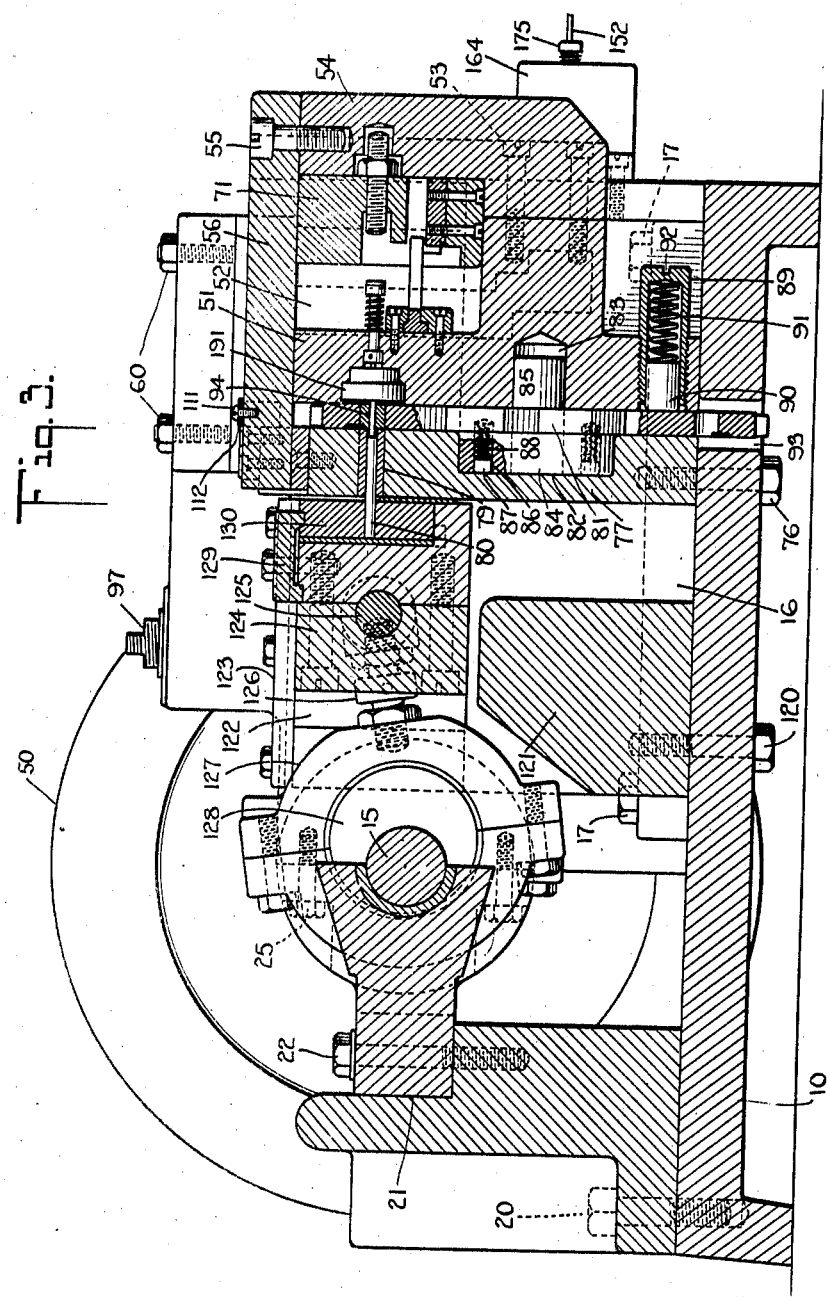

Aug. 29, 1939.  E. S. CORNELL, JR  2,170,810
MACHINE FOR FORMING COLD WROUGHT PRODUCTS
Filed Feb. 19, 1936  9 Sheets-Sheet 4
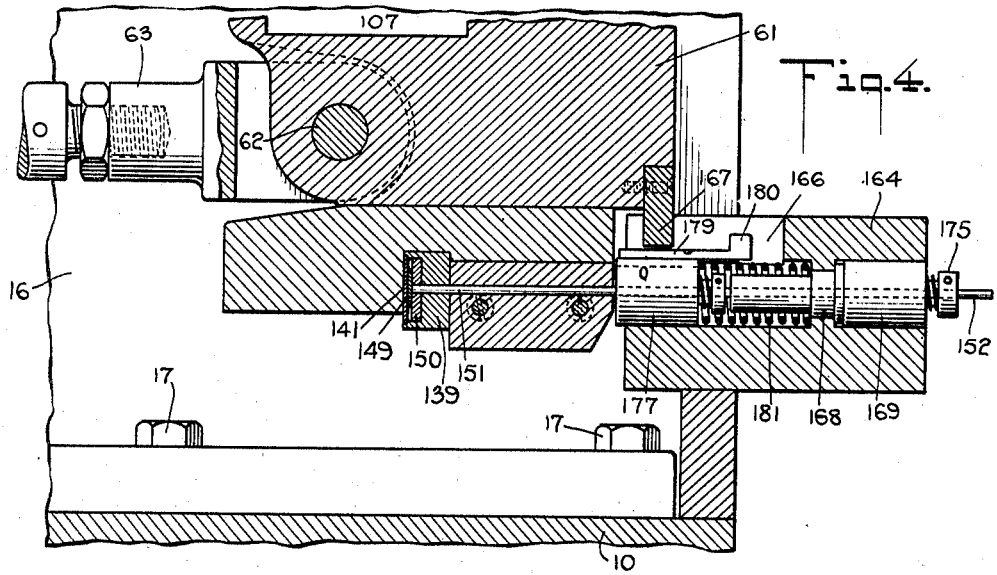
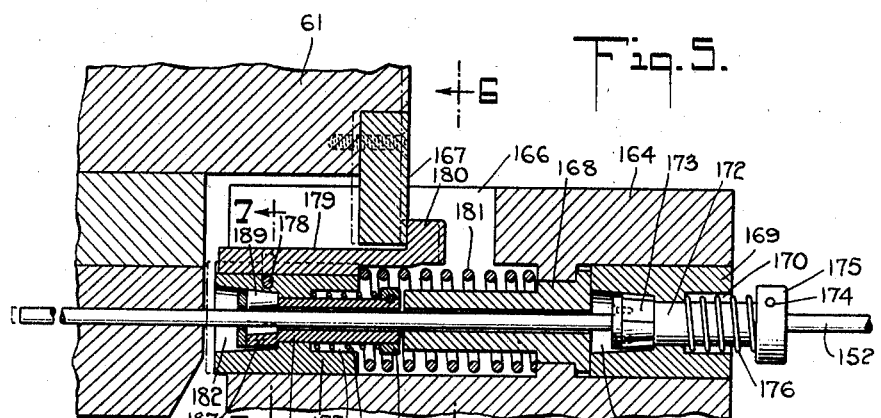
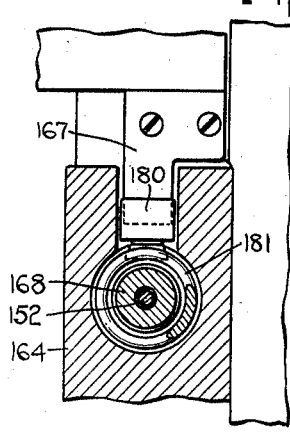
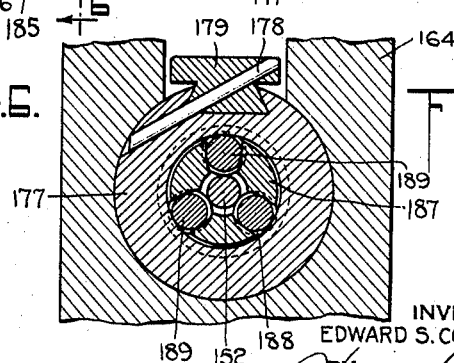
INVENTOR
EDWARD S. CORNELL, JR.
BY
HIS ATTORNEY Aug. 29, 1939.                E. S. CORNELL, JR                2,170,810
                    MACHINE FOR FORMING COLD WROUGHT PRODUCTS
                      Filed Feb. 19, 1936           9 Sheets-Sheet 5
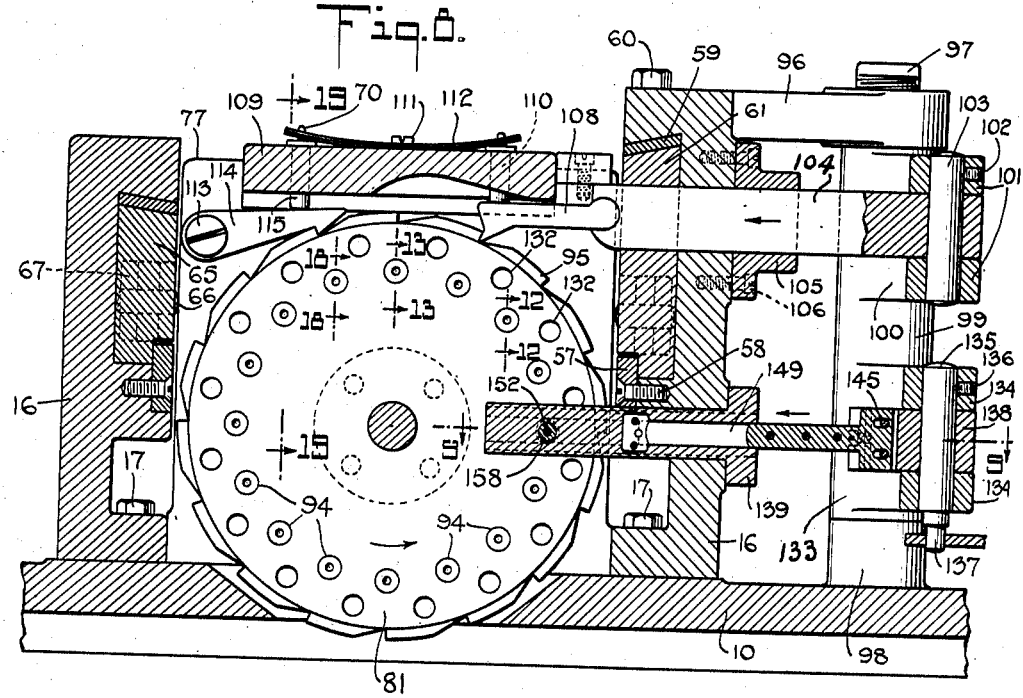
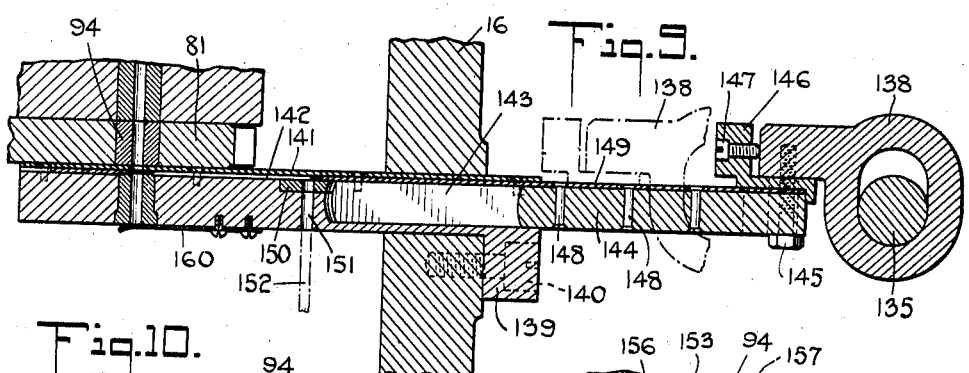
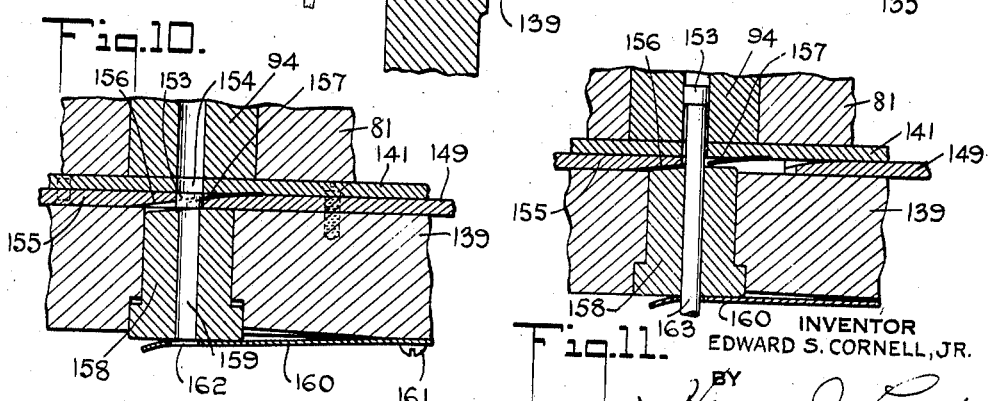
INVENTOR
EDWARD S. CORNELL, JR.
BY
HIS ATTORNEY Aug. 29, 1939.  E. S. CORNELL, JR  2,170,810
MACHINE FOR FORMING COLD WROUGHT PRODUCTS
Filed Feb. 19, 1936  9 Sheets-Sheet 6
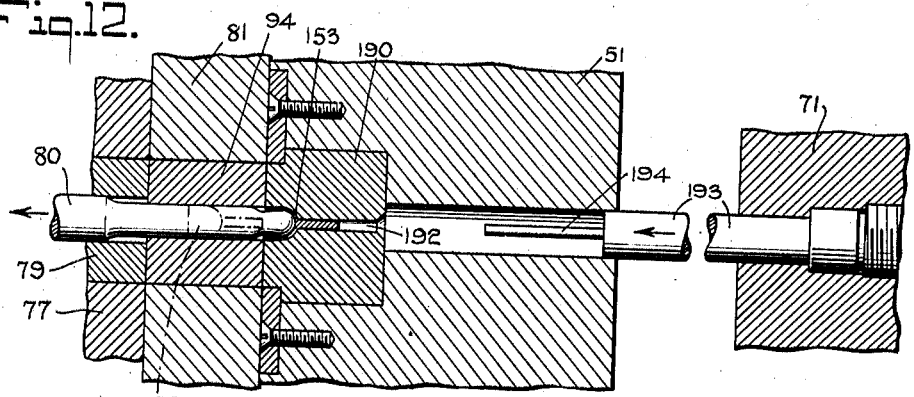
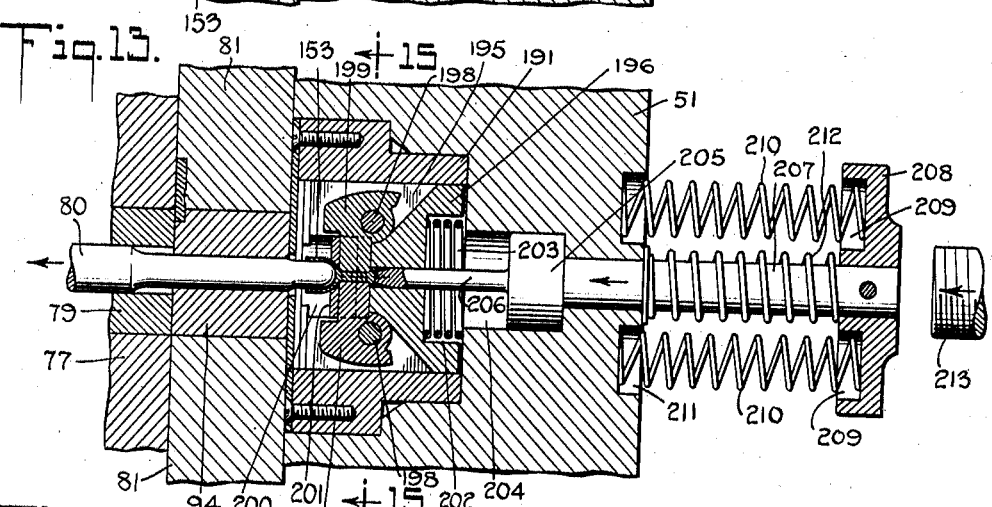
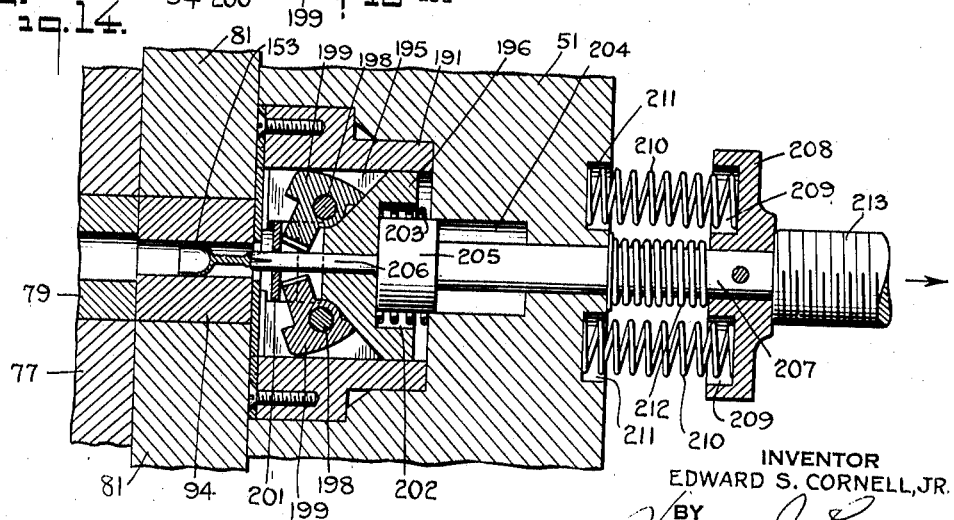
INVENTOR
EDWARD S. CORNELL, JR.
BY
HIS ATTORNEY

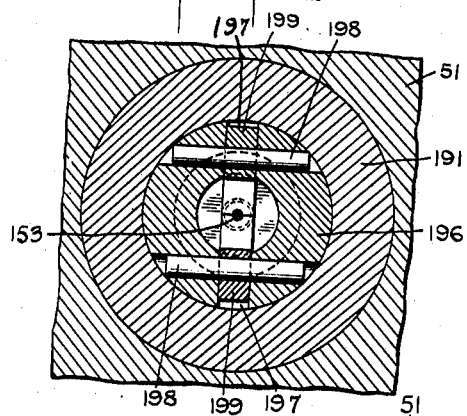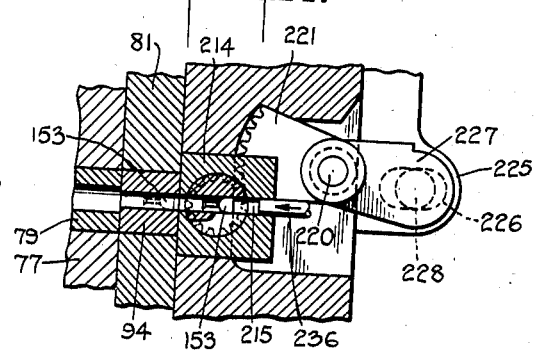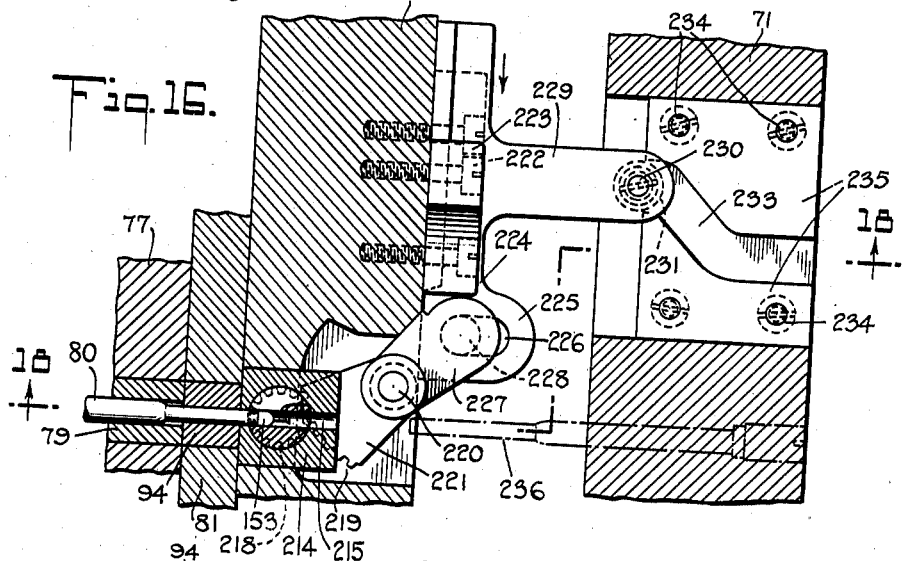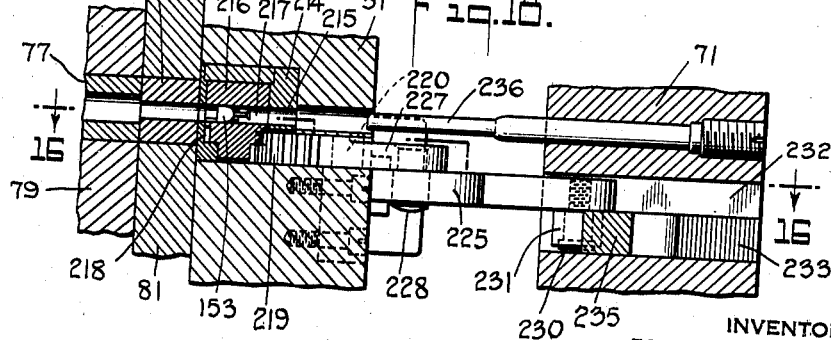
Aug. 29, 1939.  E. S. CORNELL, JR  2,170,810
MACHINE FOR FORMING COLD WROUGHT PRODUCTS
Filed Feb. 19, 1936  9 Sheets-Sheet 7
INVENTOR
EDWARD S. CORNELL, JR.
BY
HIS ATTORNEY Aug. 29, 1939.　　　　E. S. CORNELL, JR　　　　2,170,810
MACHINE FOR FORMING COLD WROUGHT PRODUCTS
Filed Feb. 19, 1936　　　9 Sheets-Sheet 8

INVENTOR
EDWARD S. CORNELL, JR.
BY
HIS ATTORNEY

Aug. 29, 1939. E. S. CORNELL, JR 2,170,810
MACHINE FOR FORMING COLD WROUGHT PRODUCTS
Filed Feb. 19, 1936 9 Sheets-Sheet 9
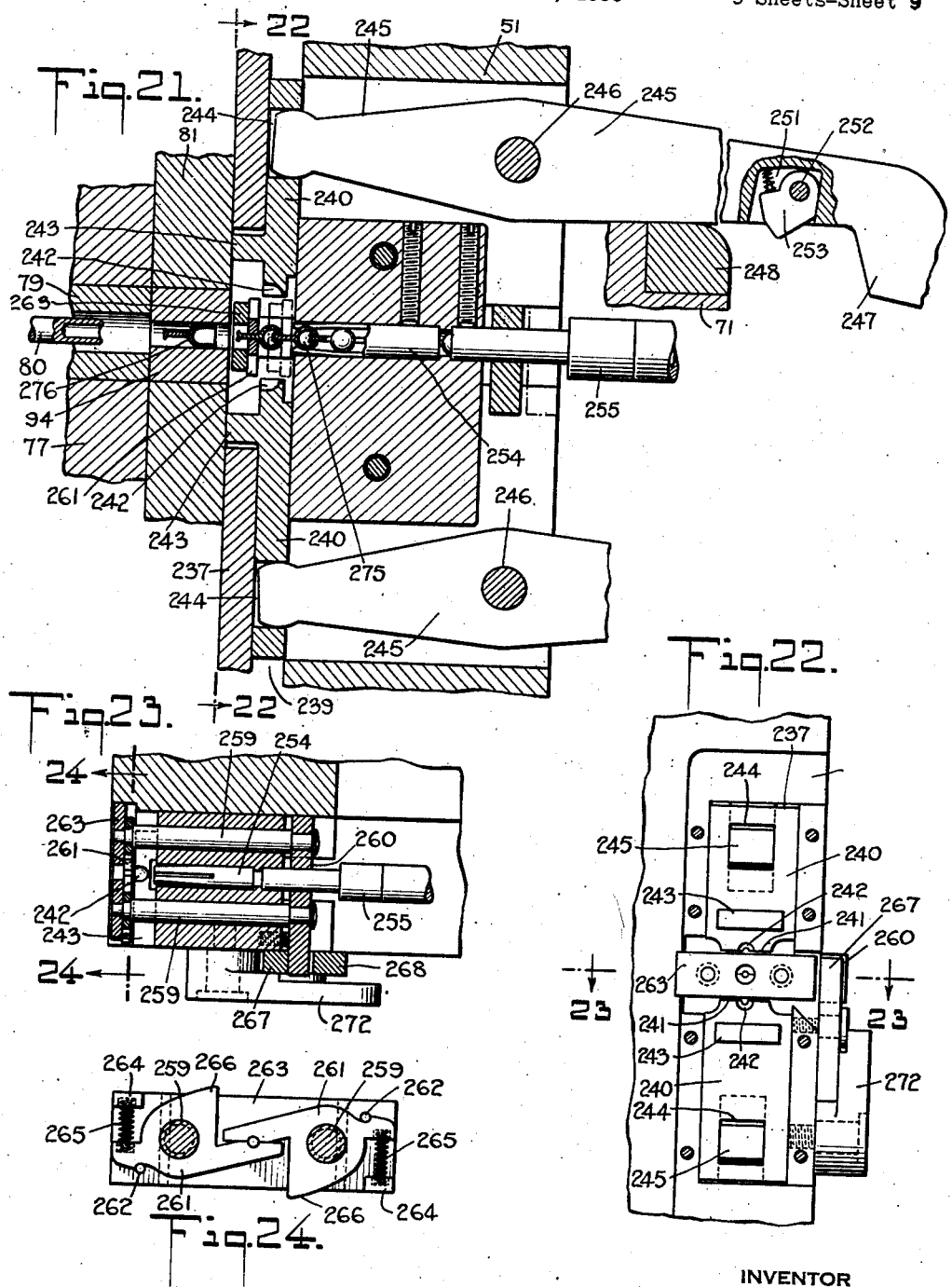
INVENTOR
EDWARD S. CORNELL, JR.
BY
HIS ATTORNEY Patented Aug. 29, 1939

2,170,810

UNITED STATES PATENT OFFICE 2,170,810

MACHINE FOR FORMING COLD WROUGHT PRODUCTS

Edward S. Cornell, Jr., Larchmont, N. Y., assignor, by mesne assignments, to American Radiator & Standard Sanitary Corporation, New York, N. Y., a corporation of Delaware Application February 19, 1936, Serial No. 64,722

6 Claims. (Cl. 59—2)

My present invention relates to machines for forming cold wrought products.

My machine forming the subject matter of my present invention is particularly adapted for the making of cold wrought products from bar, wire or like continuous stock, and in which the various elements of the products are particularly adapted to be interconnected seriatim. Such products are represented in general nature of seriatim interconnection by the commercially so-called flexible chain. Such products, however, are merely representative of a large class of articles that are adapted to be fabricated by the cold wrought process effected by my machine, and my machine is capable of producing any article within the capacity of the machine from continuous stock and by cold wrought process, regardless of whether the individual units so produced are serially interconnected or not.

The machine forming the subject matter of my present invention is illustrated as a machine for specifically producing flexible chains of indefinite lengths, but such showing of my machine is illustrative only and I am not to be limited merely to the production of such product. In my copending application, Serial No. 755,566, filed December 1, 1934, and entitled Cold wrought chain, now United States Letters Patent No. 2,110,201, issued March 8, 1938, I have described and claimed a flexible chain which is capable of being produced by and has been produced by my present machine.

My present machine is designed to produce articles by cold wrought process from continuous stock, and in which machine a billet or slug of material is automatically severed from the end of the stock and then successively subjected to a plurality of operations for the purpose of forming the slug into an article of the shape desired. Desirably the cubical content of each slug so severed from the length of stock is of predetermined equality to the cubical content of the produced article; also such articles may be serially interconnected, as in the case of a flexible chain, or may be individual as in the case of articles which are not to be interconnected with each other.

In carrying out my invention I arrange the continuous stock to be automatically fed into the machine and automatically sever slugs successively therefrom, such severing being accomplished substantially without waste, and the severed slugs are successively brought into position and operated upon, the respective mechanisms of my machine performing the successive operations to produce the article desired. Pursuant to preferred embodiments of my invention, the respective operations are carried out simultaneously, the slug being advanced from the position of severing by a carrier and then successively moved from position to advance position, until the desired operations are performed thereon. The completed article or articles, whether individual and duplicates of one another, or serially interconnected, are fed out of the discharge of the machine, and into any proper receiving device, if desired.

An object of my invention is an improved machine for producing articles by the cold wrought process.

An object of my invention is an improved machine for producing articles in succession from slugs obtained from a length or lengths of stock.

An object of my invention is an improved automatic machine for producing duplicate articles by the cold wrought process in a succession of steps on slugs obtained from continuous stock.

An object of my invention is an improved automatic machine for producing articles by the cold wrought process from continuous stock without substantial waste of material.

Among the advantages obtained by my machine are the production of articles by cold flow of the original metal of the billets or slugs into final status whereby the material by such cold flow attains superior qualities, inter alia, increased tensile strength, increased resistance against bend, rupture, fracture and the like; also, marked economies in saving of material, usually total avoidance of scrap; automatically effected attainment of configuration of final products heretofore produceable solely by screw-machine operations; attendant low labor costs, including savings of cost of manual handling and transfer from stage to stage of operations; production of non-cylindrically internally and/or externally configurated products and products having dimensions greater than that of the original billet or slug and therefore not produceable by screw-machine operations; elimination of departures from set dimensions of final products and other variants incident to the human factor in machine operation; etc.

Further features and objects of the invention will be more fully understood from the following detail description and the accompanying drawings, in which Fig. 1 is a plan view of a machine embodying my invention, preferred in arrangement and construction for the production of a flexible chain or like products.

Fig. 2 is a front elevation of Fig. 1.

Fig. 3 is a central sectional elevation on line 3—3 of Fig. 1, as viewed in the direction of the appended arrows.

Fig. 4 is a sectional view on the line 4—4 of Fig. 1, somewhat enlarged, as viewed in the direction of the appended arrows; this view illustrates the continuous stock feeding and slug severing mechanism.

Fig. 5 is an elevational view of the right hand end of Fig. 4, the stock feeding elements being shown in vertical section.

Fig. 6 is a sectional view on line 6—6 of Fig. 5.

Fig. 7 is a sectional view on line 7—7 of Fig. 5.

Fig. 8 is a sectional elevation on line 8—8 of Fig. 1.

Fig. 9 is a sectional plan view on line 9—9 of Fig. 8.

Fig. 10 is an elevational view of the left hand end of Fig. 9, and showing a slug severed from the stock in registry with a slug holding perforation in the dial plate, serving as the carrier.

Fig. 11 is a view similar to Fig. 10, but showing the slug severing knife in retracted position, and the plunger for advancing a severed slug into position in a perforation in the dial plate.

Fig. 12 is a sectional elevation, on an enlarged scale, on line 12—12 of Fig. 8.

Fig. 13 is a sectional elevation, on an enlarged scale, on line 13—13 of Fig. 8; this view shows the slug in the heading punch, and the holding jaws of the punch in operative position relative to the slug.

Fig. 14 is a view similar to Fig. 13, but showing the holding jaws in open, i. e., retracted position.

Fig. 15 is a sectional elevation on line 15—15 of Fig. 13.

Fig. 16 is a sectional plan view on line 16—16 of Fig. 18, and showing the slug reversing mechanism in normal position, i. e., prior to the reversing operation.

Fig. 17 is a view of the lower left hand portion of Fig. 16, and showing the position of a slug after the reversing operation has been performed.

Fig. 18 is a sectional elevation on the line 18—18 of Fig. 8, on an enlarged scale, and also a sectional elevation on line 18—18 of Fig. 16.

Fig. 21 is a view similar to Fig. 20, but showing the closing jaws in open position.

Fig. 22 is a sectional elevation on line 22—22 of Fig. 21, as viewed in the direction of the appended arrows.

Fig. 23 is a sectional plan view on line 23—23 of Fig. 22.

Fig. 24 is a sectional elevation on line 24—24 of Fig. 23.

Introductory description

Figure 19:
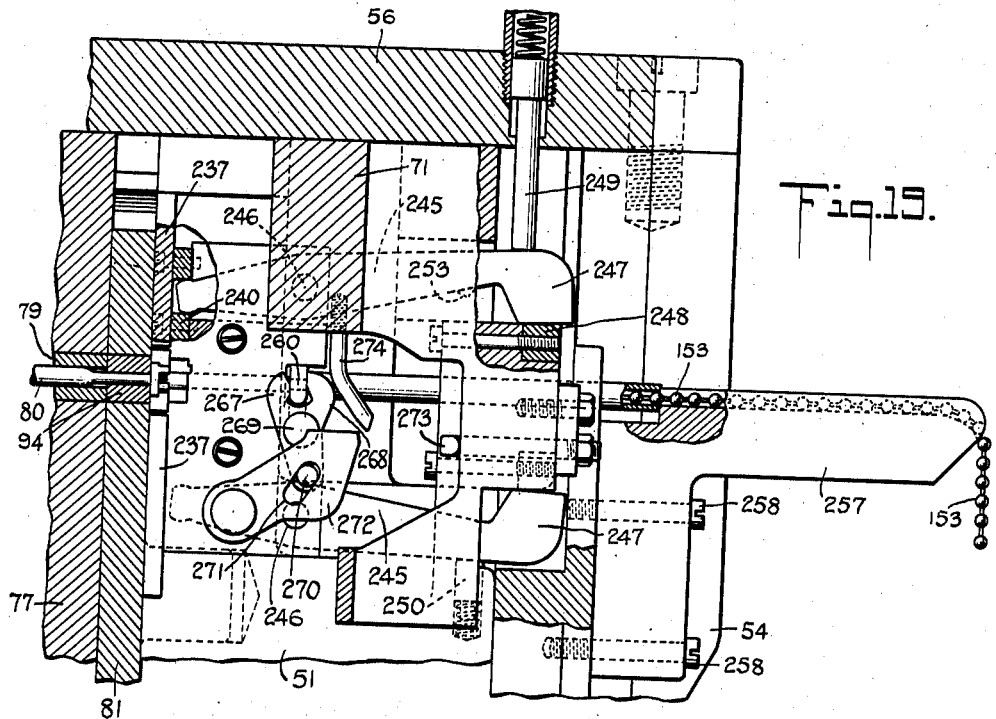
Fig. 19 is a sectional elevation on line 19—19 of Fig. 8.

Referring to the preferred embodiment illustrated in the drawings, 10 designates a base or bed plate adapted to be mounted on any suitable support, such as a bench, and on which base are mounted the assembled mechanisms of my machine.

At one corner of the base and formed integral therewith, is a raised bed plate 11 on which is shown mounted a motor or other prime mover. Secured to the base by bolts 13 are bearings 14, 14. The bearings 14 are in alignment with each other, and rotatably mounted in such bearings is a main drive shaft 15. Centrally located on the base 10 are frame members 16, arranged parallel to one another and extending substantially perpendicular to the main drive shaft 15; and such members 16 are shown secured to the upper face of the base 10 by bolts 17. The support member 18, extending transversely to the frame members 16, 16, is shown bolted to the base 10 by bolts 19. At the end of each of the frame members 16, adjacent the member 18, is a bearing member 20, in which rotates the main drive shaft 15. Formed on the upper edge of the support member 18 and lying parallel to the shaft 15, is a rabbet 21, in which is secured by bolts 22 a member 23, having formed at each end a bearing member 24 associated with the bearing members 20 and are secured to such bearing members by the bolts 25. Formed integral with the member 23 and centrally located with respect thereto and extending forwardly therefrom is a member 26 having at its outer or free end a half bearing 27, and which half bearing engages with and supports the main drive shaft 15.

Secured to the left hand frame member 16, as viewed in Fig. 1, and extending laterally outward therefrom, is a stub shaft 28. Rotatably mounted on the stub shaft 28 is a gear 29 and a pinion 30 arranged to be rotated thereby. The gear 29 meshes with and is driven by a pinion 31, mounted on the drive shaft 32 of the motor 12. Idly rotatable on the main drive shaft 15 is a sleeve 33, which has secured thereto, or formed integral therewith, at one end thereof a gear 34. Such gear 34, meshes with and is driven by the pinion 30, rotatably mounted on the stub shaft 28. Formed integral with the sleeve 33 and at its end remote from the gear 34, is the female member 35 of a clutch.

Mounted on the main drive shaft 15 for rotation therewith but capable of sliding movement axially with respect thereto is a sleeve 36 provided with an annular groove 37 intermediate its ends. Formed integral with the sleeve 36 and at one end thereof is a male clutch member 38 which cooperates with the female clutch member 35.

Formed integral with the bed plate 11, and parallelly arranged with respect to each other are bearing lugs 39, in which is secured a shaft 40, which extends transversely of and perpendicular to the main drive shaft 15. Rotatably mounted on the shaft 40 are the upwardly extending members 41 and 42, which members are joined together at the top to form an integral structure, terminating in a handle 43, by means of which the members 41 and 42 may be rotated on the shaft 40. Extending inwardly from each of the members 41 and 42, and in substantial alignment with each other and perpendicular to the axis of the main drive shaft 15 are stub shafts 44, on which are rotatably mounted rollers 45. The rollers 45 extend into the annular groove 37 of the sleeve 36, and when members 41 are rotated on shaft 40 by the handle 43 the rollers 45 engage with one or the other face of the annular groove 37, to displace the sleeve 36 axially of the shaft 15, and in turn to shift the male clutch member 38 into or out of engagement with the female clutch member 35, and thereby connect or disconnect at will the main drive shaft 15 relative to the driving motor 12. When the handle 43 as shown in Fig. 2 is moved to the right the clutch members 35 and 38 are brought into engagement with each other and the main or drive shaft 15 is then rotated under power by the motor 12. Upon movement of the handle 43 to the left as shown in Fig. 2 the clutch members 35 and 38 are disengaged and the main drive shaft 15 comes to rest. In order to insure against accidental coupling of the clutch members 35 and 38 a boss 46 which is adapted to be engaged by a hook 47 formed on the outer end of a link 48, pivotally mounted on the shaft 49, mounted in the shift lever 41. In order to insure steady rotary movement of the main drive shaft 15 under load, I utilize a fly wheel 50, secured thereto, say, adjacent the right hand bearing 14, see Figs. 1 and 2.

Secured to the base 10 in any suitable manner as by bolts, is a front die holder 51 (see Fig. 3). This die holder 51 is adjacent to the front edge of the base 10 or at the edge remote from the shaft 15. The front die holder 51 at its upper outer face is provided with a transversally extending rabbet 52, and which rabbet extends therefore transversely of the space lying between the members 16. The front face of the front die holder 51 has secured thereto by bolts 53 a front bracket 54 and which bracket on its upper rearward face is provided with a rabbet which corresponds in dimensions with the rabbet 52. When the front bracket 54 is assembled on the front of the front die holder 51, the rabbet 52 and the rabbet in the rear face of the front bracket 54 constitute a transverse passage for the reception of a sliding member to be hereinafter described. Secured to the top of the front die holder 51 and to the top of the front bracket 54 by screws 55 is a top plate 56, and which top plate forms a cover for the space formed by the rabbets above described.

Formed in the right hand member 16 and on the inner face thereof as clearly shown in Fig. 8 is a slideway, such slideway provided at its lower end with a bearing member 57 movably secured in position by the screws 58, and at its top end with a gib 59. Extending through the upper end of the member 16 and into association with the gib 59 are the screws 60, by means of which pressure on the gib 59 may be adjusted. Slidably mounted in the slideway above described is a crosshead 61. Adjacent to the rear end of the crosshead 61 is arranged a transverse shaft 62 to which is pivotally attached one end of an adjustable connecting rod 63. The other end of this connecting rod is provided with an eccentric strap 64 which engages with and is driven by an eccentric (not shown) secured to or formed integral with the main or drive shaft 15. The other member 16 is also provided with a slideway similar to the slideway described with reference to the right-hand member 16 and in such slideway is mounted for reciprocation, the crosshead 65. The rear end of this crosshead 65 is provided with a shaft 66 on which is rotatably mounted one end of the adjustable connecting rod 67. The end of the connecting rod 67 remote from the crosshead 65 is provided with an eccentric strap 68 which engages with and is driven by an eccentric (not shown) secured to the main or drive shaft 15.

Each of the crossheads 61 and 65 have formed integral at their forward ends, or the lower ends as shown in Fig. 1, an inwardly extending projection 69, these projections being perforated parallel to the main body of the crossheads to permit the extension therethrough of threaded studs 70. Mounted in the transverse passage formed by the rabbet 52 in the front die holder 51 and the rabbet formed in the front bracket 54 and for sliding movement in a direction parallel to the members 16 is a tool-holding block 71. Extending outwardly from the ends of the tool-holding block 71 toward the crossheads 61 and 65 are projections 72 into which screw the ends of the studs 70. On the studs 70 between the projections 69 and 72 are sleeves 73. These sleeves 73 may be of any length desired, the length of the sleeves being dependent on the required adjustment of the reciprocal tool-holding block 71. Screwing onto the studs 70 are the adjusting nuts 74 and lock nuts 75, the same being employed to rigidly connect the reciprocal block 71 to the crossheads 61 and 65.

It will be obvious from the above description that as the main or drive shaft 15 rotates, the cams referred to as being on such main or drive shaft will impart a reciprocatory motion to the crossheads 61 and 65 and therefore a reciprocatory motion of the reciprocal block 71 with respect to the front die holder 51 and the front bracket 54. Various tools and gauges are carried by the reciprocal block 71 and such elements will be referred to later in connection with the operation of the machine to produce a specific article from a billet or slug of material. It will be obvious, however, that such tools and gauges will vary in accordance with the character of the article to be made and therefore any such tools or gauges which are specifically referred to are for illustrative purposes only.

Arranged parallel to the front die holder 51, spaced apart therefrom, and secured to the base 10, in any suitable manner as by the bolts 76 is a rear die holder 77. The top surface or edge of the rear die holder 77 is secured to the top plate 56 by screws 78. The rear die holder 77 is provided with a plurality of transverse perforations in each of which is secured a hardened bushing or bearing 79. The internal diameter of such bushings may vary as occasion requires and in each of these bushings is slidably mounted a punch. Of necessity such punches will vary in diameter, with not only the character of the article to be made kept in view but also the character of the function to be performed by such punches. One of such punches is illustrated in Fig. 3 and is designated by the reference numeral 80. These punches will be referred to in detail hereinafter.

Formed in the front face of the rear die holder 77 and in the rear face of the front die holder 51 are cylindrical holes, such holes acting as bearings for a cylindrical dial plate 81. It will be noted that the cylindrical hole designated by the reference numeral 82 in the rear die holder 77 is of greater diameter than the cylindrical hole 83 in the rear face of the front die holder 51. The thickness of the dial plate 81 is such as to allow such dial plate to rotate freely but to be incapable of any substantial amount of end play. Formed integral with the dial plate 81 and on the rear face thereof is a hub 84 which is a rotating fit in the hole 82 and, formed integral with the dial plate and on the front face thereof, is a hub 85, such hub being a rotating fit in the hole 83. Arranged in the rear face of the hub 84 is a plurality of holes 86, in each of which is slidably fitted a plunger 87, such plunger having associated therewith a spring 88, and the plurality of such plungers 87 are constantly urged toward the bottom face of the hole 82 with the result that the dial plate 81 is constantly urged toward the rear face of the front die holder 51. The front die holder 51 adjacent to its lower edge is drilled and tapped to receive the externally threaded hollow bushing 89. Slidably mounted in such hollow bushing 89 is a plunger 90 and a spring 91 in such hollow bushing 89 constantly urges the plunger 90 into engagement with the front face of the dial plate 81. The degree of pressure of the plunger 90 on the dial plate 81 may be regulated by means of the hollow bushing 89 by means of a screwdriver, such bushing 89 being slotted as indicated by the reference numeral 92 for this purpose. The diameter of the dial plate 81 is limited only by the distance from the axis from the side dial plate from the lower face of the top plate 56, and it will be noted that the base 10 is cut away as indicated by the reference numeral 93 to provide a space for the dial plate 81.

*Dial plate or work carrier*

Referring now to Fig. 8, it will be noted that the dial plate 81 is provided with a plurality of hardened steel bushings 94. Such bushings are symmetrically arranged about the face of the dial plate 81 on a circle having a suitable radius, and the number of such bushings may be anything desired, depending in great measure on the character of the article to be made in the machine. Such bushings 94 are for convenience of description, numbered in the order of their arrangement in the dial plate, and counting from the bushing which is shown apparently in cross-section on the right-hand medial portion of such dial plate and numbered 1, the next bushing above is numbered 2, the next bushing is numbered 3, the next bushing is numbered 4 and so on in numerical order. The diameter of the hole through the bushings 94 may be anything desired, depending on the character and diameter of the material being worked upon and the article to be made therefrom.

About the peripheral edge of the dial plate 81 and equally spaced about such periphery are ratchet teeth 95, there being one such ratchet tooth for each of the bushings 94, and it will be noted that the position of the ratchet teeth bears a particular relation to the position of the particular bushing 94 with which it is associated.

Formed integral with the right-hand member 16, as viewed in Fig. 1, and adjacent to the bearing member 18, is a laterally projecting arm 96. The outer end of this arm 96 is drilled and tapped to receive the threaded portion of bearing pivot 97 (see Fig. 8). Formed integral with the base 10, extending upwardly therefrom and in vertical alignment with the bearing pivot 97 is a bearing boss 98. Rotatably mounted in the bearing boss 98, and on the pivot pin 97, is a sleeve 99.

Formed integral with the sleeve 99, and extending radially outward therefrom and adjacent to the upper end thereof, is an arm 100. The outer free end of this arm 100 is forked as indicated by the reference numeral 101 (see Fig. 8) and in such forked end is secured, by set screw 102, a bearing shaft 103. Between the elements of the forked end member 101, and on the shaft 103, is pivotally attached one end of a driving member 104. The driving member 104 is slidably mounted in a bearing block 105 secured to the outer face of the right-hand member 16, by screws 106. The right-hand member 16 is cut away as shown in Fig. 8 to allow free sliding movement of the driving member 104.

Also the crosshead 61 is cut as indicated by the reference numeral 107 to allow a reciprocatory motion of the driving member 104 while permitting a reciprocatory motion of the crosshead 61. The nature of the cut-away portion 107 in the crosshead 61 is clearly shown in Fig. 4. At the inner end of the driving member 104 is pivotally attached one end of a driving pawl 108, such pawl engaging with the ratchet teeth 95, as clearly shown in Fig. 8.

The top plate 56 above the dial plate 81 is cut away to allow the insertion of a plate 109 which is held rigidly in position. Such plate 109 is drilled to allow free sliding movement of a plunger 110, the lower end of which engages with the outer, or working, end of the pawl 108. Secured to the plate 109, by the screw 111, is a leaf spring 112, one end of which engages with the plunger 110 and urges the same constantly downward into association with the pawl 108. Pivotally mounted on the front face of the rear die holder 77, by pivot screw 113, is a holding pawl 114. The plate 109 is provided with a perforation in which is slidably mounted a plunger 115, the lower end of which engages with the outer end of the holding pawl 114 and the upper end of which is engaged by the leaf spring 112 to thereby yieldingly and at all times hold the holding pawl 114 in engagement with the ratchet teeth 95.

The driving member 104 in its reciprocatory movement, for example, in the direction of the arrow, shown in Fig. 8, will cause the driving pawl 108 to rotate the dial plate 81 in a counter-clockwise direction about its axis through the space of one tooth. In such rotary movement the holding pawl 114 will ride up on the next succeeding ratchet tooth 95, forcing the plunger 115 up against the tension of the leaf spring 112, and when the end of the next succeeding tooth has come into position, the plunger 115 will force the holding pawl 114 into position to hold the dial plate in its moved position against retrograde movement.

The stroke of the working member 104 is so regulated as to impart the proper extent of movement to the driving pawl 108, and this is accomplished in the following manner. Secured to the main or drive shaft 15 adjacent to the fly wheel 50 is the cam 116 in which is formed a cam race 117. Formed integral with the sleeve 99 and extending radially outward therefrom, in a direction substantially opposite to the arm 100, is an arm 118. Rotatably mounted on the end of the arm 118 is a cam roller 119 which works in the came race 117. It will be obvious from the above description that as the main or drive shaft 15 rotates, the cam 116 will be rotated simultaneously therewith, thus rotating the cam race 117, and such cam race is so proportioned as to impart an oscillatory movement to the sleeve 99, with the result that an arcuate movement is imparted to the arm 100, thus imparting a reciprocatory motion to the driving member 104.

The intermittent step-by-step movement of the dial plate 81 is in synchronism with the reciprocating movement of the crossheads 61 and 65, and the forward step-by-step movement of such dial plate 81 takes place during the first part of the forward movement of said crossheads.

*Dial plate positioning*

In order to prevent the possibility of the dial plate 81 getting out of position during the operation of the machine, and particularly during the operation of the tools, such as the tool 80, I provide means for accurately positioning the dial plate 81 as follows:

Secured to the base 10 by bolts 120, see Fig. 3, and between the rear die holder 77 and the main or drive shaft 15, is a member 121, at the upper or lateral portions of which are provided slideways 122. These slideways 122 are closed at the top by guide plates 123. Slidably mounted in the slideways 122 is a crosshead 124. Secured in the crosshead 124 is a shaft 125. Rotatably mounted on the shaft 125, adjacent to each of the slideways 122 and extending rearwardly therefrom, is one end of the connecting rods 126. These connecting rods are adjustable, and at their rearward end are connected to eccentric straps 127. The eccentric straps 127 are each associated with an eccentric 128 secured to, or formed integral with, the driving shaft 15. Secured to the front face of the crosshead 124 by a clamp 129 is a tool holder 130, and in the tool holder is secured not only the punch 80 illustrated in Fig. 3, but a plurality of such punches, as shown in Fig. 1, and also a gauge pin 131, and which gauge pin is adapted to engage in one or the other of a plurality of perforations 132 arranged symmetrically about the face of the dial plate 81 adjacent to the peripheral edge thereof and extending transversely therethrough.

There is one of the perforations 132 for each of the ratchet teeth 95, and therefore for each of the bushings 94, and the position of the perforations 132 is such that when the driving pawl 108 advances the dial plate 81 in a counter-clockwise direction, it will bring the perforations 132 successively into, not only locking position in respect to the locking pawl 114, but also into position to be engaged by the gauge pin 131. This gauge pin 131 will of course move into association with the perforations 132 in advance of the various punches 80 moving into engagement with the bushings 94.

*Billet or slug cutting*

Simultaneously with the rocking of the arm 100 to move the driving member 104 to rotate the dial plate 81 through the space of one ratchet tooth 95, the member which produces the reciprocating motion of the driving member 104 also produces another motion as follows. Formed integral with the sleeve 99, and adjacent to the boss 98, is the radially extending arm 133, the outer end of which is forked as indicated by the reference numerals 134. Extending through and between such spaced arms is a shaft 135, such shaft being held against rotary movement by the set screw 136. The shaft 135 has a lower extension 137 pivotally secured to an end of a spring-controlled rod 137a, said rod tending to urge the sleeve 99 to the right, as viewed in Fig. 2. Rotatably mounted on the shaft 135 between the members 134 is a bearing 138.

The bearing 138 is shown in section in Fig. 9, and it will be noted that the bearing surface is elongated so as to permit a movement of the shaft 135 in such bearing. The righthand member 16 is transversally perforated in substantial alignment with the axis of the dial plate 81 to receive a member 139. This member 139 is secured in position, as by the screw 140, and has one face thereof arranged parallel to and slightly spaced apart from the dial plate 81, as clearly shown in Fig. 9. Such face has formed thereon, by means of a plate 141, a guideway 142 for a cutoff knife. Also formed in the member 139, and on the front face thereof, is a guideway 143 in which is slidably mounted a knifeholder 144. The knifeholder 144 is attached to the member 138 by the bolts 145, an adjusting block 146 being interposed between the knifeholder 144 and the member 138. An adjusting screw 147 cooperating with the block 146, and the member 138 enables adjustment of the knifeholder 144 with respect to the guideway 143 to be made. Secured to the knifeholder 144, by rivets 148, is the knife 149, and such knife slides in the guideway 142 above described and the knifeholder 144 slides in the guideway 143.

In the member 139 adjacent to the end of the slideway 143 is secured a hardened steel anvil 150, the outer or inner face of which lies in the plane in which rests the inner face of the member 139. The anvil 150 is perforated as shown in Fig. 9 and such perforation is in alignment with a transverse passage 151 in the member 139. The diameter of the perforation 151 is substantially that of the diameter of the bar or rod 152 of the material from which billets or slugs 153 are to be cut, and from which billets or slugs the articles to be made are formed.

The knifeholder 144 carrying the knife 149 reciprocates in the manner above described and as the bar or rod 152 is moved transversely of the member 139, or upwardly as viewed in Fig. 9, the end of the bar or rod 152 engages with the end face of the plate 141, thus determining the limit of movement of the bar or rod. The knife 149 in moving to the left, as shown in Fig. 9, shears off a slug or billet 153 of sufficient cubic capacity to permit the manufacture of the desired article therefrom.

After the shearing off of the billet 153, such billet is moved along the passage 142 by the knife 149, to the left, as shown in Figs. 9 and 10, until it approaches a point in axial alignment with the appropriate bushing 94 in the dial plate 81. At such point the plate 141 is provided with a perforation 154 in alignment with the perforation in the bushing 94, and also the end of the passage 142 is blocked by a stop 155, so that as the slug 153 is moved to the left, as shown in Figs. 9 and 10, the extent of its movement in such direction will be limited by the stop 155. The lower front edge of the stop 155 is bevelled as indicated by the reference numeral 156. On the under face of the plate 141, on the side of the perforation 154 opposite the stop 156, is provided a leaf spring 157, the free end of which is adjacent to the perforation 154 and which free end extends downwardly toward the member 139. The member 139 is provided with a perforation in alignment with the perforation 154 in the plate 141, and in such perforation is slidably mounted a bushing 158. This bushing is provided with an axial perforation 159, less in diameter than the perforation 154. The bushing 158 is yieldingly held in position by a leaf spring 160, secured to the member 139 by the screws 161, and provided with a relatively large perforation 162, to permit access to the perforations 159 in the bushing 158.

As the knife 149 moves to the left, as shown in Fig. 9, it will shear off from the rod or bar 152, a billet or slug 153, and will move such slug or billet to the left of the slideway 142. As such knife approaches the limit of travel, it will be noted, on referring to Fig. 10, that the slug 153 will be forced under the leaf spring 157 and will compress such spring until the billet or slug 153 has been forced past the free end of such spring and slug 153 has reached the limit of its motion, whereupon the free end of the leaf spring 157 will drop in behind such billet or slug and will prevent its movement out of alignment with the perforation 154.

Slidably mounted in bushing 158, and carried by the tool holder 71, is an ejecting pin 163, which, upon the reciprocation of the tool block 71 toward the main or drive shaft 15, as viewed in Fig. 3, moves the ejecting pin 163 through the perforation 159 in the bushing 158 into engagement with the billet or slug 153 and forces the same through the perforation 154 in the plate 141 and into position within the bushing 94 in the dial plate 81. As the main or drive shaft 15 rotates, the tool block 71 will be moved to the right, as viewed in Fig. 3, and will move the end of the ejecting pin 163 out of the bushing 94 to permit intermittent rotation of the dial plate 81 at the proper time.

Billet or slug material feeding means

Associated with the billet or slug cutting instrumentalities above described is a bar or rod feeding device for intermittently feeding the bar or rod into position to have the billets or slugs cut therefrom. This device is shown in detail in Figs. 4, 5, 6, and 7, and referring to such figures, the front die holder 51 is perforated to receive a casing 164, such casing being secured in position by screws 165. The rear upper portion of the casing 164 is slotted, as indicated by the reference numeral 166, and in such slot reciprocates a working member 167 secured to the front lower end of the crosshead 61. The casing 164 is provided with a counterbored portion on its front end to receive and hold an elongated bushing 168, through which may freely pass the bar or rod 152. This bushing 168 is held in position against longitudinal movement by a casing 169.

The casing 169 is counterbored at its front and rear ends, the front counterbore 170 being a straight counterbore and the counterbore 171 at the rear end being a tapered counterbore. The material of the casing 169 between the counterbore portions 170 and 171 is drilled to receive, as a sliding fit, a cylindrical carrier 172, such carrier being provided with a perforation extending axially therethrough and substantially the same diameter as the passage through the bushing 168. Secured to the carrier 172, and housed within the tapered counterbore 171, is a clutch 173, the details of which will be described later. Secured to the outer end of the carrier 172, as by the pin 174, is a collar 175 and between the inner end of the collar 175 and the bottom of the straight counterbored portion 170 is a coil spring 176, which tends always to move the carrier 172 to the right, as shown in Fig. 5, thereby continually urging the clutch 173 toward the bottom of the taper counterbore portion 171, or into position where the clutch will grip the bar or rod 152.

Slidably mounted in the casing 164, and at the rear end thereof, is a holder 177, in the upper portion of which is secured by pin 178, a member 179. This member 179 at its forward end has formed integral therewith, an upwardly extending projection or tooth 180, which lies in the path of movement of the downwardly extending tooth 167 on the lower edge of the crosshead 61. The distance between the front end of the upwardly extending tooth 180, and the front end of the slot 166 in the casing 164, is sufficiently large to permit free movement of the projection or tooth 180 through a full stroke of the downwardly extending tooth 167. Between the front end of the sliding member 177, and an abutment formed in the casing 164, is a coil spring 181 which constantly urges the sliding member 177 to the rear, or to the left as shown in Fig. 5, the rearward movement being limited by the rearward movement of the downwardly extending tooth 167. The rear end of the sliding member 177 is taper counterbored, as indicated by the reference numeral 182, and the front end of such casing 177 is straight counterbored, as indicated by the reference numeral 183.

The material of the sliding member 177 is drilled to receive, as a sliding fit, a cylindrical bushing 184, the perforation through such bushing being of a diameter substantially equal to the diameter of the perforation in the bushing 168. Pinned to the front end of the bushing 184 is a collar 185, and between the rear end of such collar, and the bottom of the straight counterbore 183, is arranged a coil spring 186 which constantly urges the bushing 184 to the right, as shown in Fig. 5.

Arranged at the rear end of the bushing 184 is a clutch mechanism which works in and is controlled by the taper counterbore 182. This clutch mechanism is shown in cross section in Fig. 7 and is identical with the clutch mechanism 173, above referred to as being associated with the sleeve 172. Such clutch mechanism comprises a body portion 187, formed integral with the sleeve 184, and provided with a plurality of slots 188 of any desired number. Usually three is sufficient, and in each of these slots 188 is placed a tapered roller 189, the taper of such rollers being substantially that of the taper of the counterbored portion 182.

Assuming the parts comprising the device are constructed and arranged as shown in Fig. 5, and that at the particular instant the tooth 167 is moving to the right, as shown in Fig. 5, such tooth engaging with upwardly extending projection or tooth 180, it is obvious that the slidable carrier 177 will be moved to the right against the tension of the coil spring 181, and also against the tension of coil spring 186. Under such circumstances it is obvious that the righthand end of the bushing 184, and the collar 185 engaging with the left hand end of the bushing 168, will cause a relative movement of the clutch rollers 189 and the taper bore portion 182, thereby freeing such clutch rollers 189 from the bar or rod 152. Also it will be obvious, that the ensuing effect of such movement on the clutch mechanism 173 will be for such clutch mechanism 173 to more tightly grip the bar or rod 152, and thus any movement to the right of the bar or rod 152 with respect to Fig. 5, will be prevented.

As the upwardly extending projection 180 reaches the limit of its movement in a righthand direction, the slidable member 177 will be brought to rest, and as the crosshead 61 begins its movement to the left, the slidable member 177 will travel with the same, thereby bringing the clutch mechanism associated with the bushing 184 into gripping position with relation to the bar or rod 152, and as further lefthand movement of the sliding member 177 continues, it is obvious that the bar or rod 152 will be carried with it and the lefthand movement of the rod 152 will continue as the lefthand movement of the bar or rod 152 will be permitted by the clutch 173. Such movement to the left will tend to move the clutch rollers associated therewith out of gripping condition with respect to the rod 152.

The above described feeding mechanism therefore will positively prevent retrograde movement of the rod or bar 152 at all times, and will also positively feed such rod intermittently, so as to always bring at the proper time, a sufficient length of bar or rod for the knife 149 to shear off a billet or slug 153.

The above operations will be performed regardless of the type of article it is desired to produce on the machine. For each revolution of the main or drive shaft 15 therefore, the dial plate 81 will be rotated in a counterclockwise direction, as viewed in Fig. 8, through the space of one of the ratchet teeth 95, and as the main or drive shaft 15 rotates the crosshead 124 will bring into engagement with the appropriate perforation 132, a holding or gauge pin 131.

The article to be made may, and possibly will, require a plurality of operations to be performed on the billet or slug 153 before such article is completed and ejected from the machine, and therefore the number of punches or other devices carried by the crosshead 124 will vary. Also the number of dies or gauges or other devices carried by the crosshead 61 will likewise vary, the number being dependent always upon the character of the article to be made.

Operation to produce article

As an illustration of an article that may be made on my present machine, I have elected to describe the manufacture of a so-called bead chain element, and have so adapted the machine as to indicate such bead chain with the component elements arranged seriatim. The article utilized however, is merely for illustrative purposes, and it is to be understood that I am not to be limited to a machine which will construct or make such articles merely, as it is within the scope of my invention to make articles whether of solid or tubular form, or of any hollow form by cold working, a second illustration of such article being, for example, the fitting described and claimed in my presently co-pending application, Serial No. 153,728, entitled Method of forming cold worked articles. In the making of the present articles—that is a bead chain element—a plurality of operations are performed in succession on each article and a plurality of such articles are operated upon simultaneously. For example, where four operations are necessary for the completion of a bead chain element, such operations are performed in succession on each of the elements to be constructed, and when the machine is operating, one of each of these operations is being simultaneously performed, each operation on a different element.

In the front die holder 51 is arranged a plurality of forming dies or other tools designed to co-operate with other mechanism for forming or shaping, or otherwise working on, a billet or slug 153. In the holder 130 attached to the crosshead 124 is arranged a plurality of forming punches or other forming tools of which that numbered 80 is characteristic. Each of these punches, or other tools cooperates with a particular die or other structure, as indicated by the reference numeral 190 in Fig. 12, or 191 in Figs. 3, 13 and 14. Each of the operating tools, as for example the operating tool 80, as in Fig. 12, is slidably mounted in a bushing 79 in the rear die holder 77. The perforation through the bushing 79 in the rear die holder 77 is always in alignment with the axis of the forming or otherwise operating tool 190, 191, or in alignment with that portion which holds the billet or slug 153 to be operated on.

As the dial plate 81 rotates step by step, the perforations in the bushings 94 therein are successively brought into axial alignment with the perforations in the bushings 79 in the rear die holder 77, and with the working portion of the dies or other tolls 190, 191. When the dial plate 81 is brought to rest, each of the bushings 79 in the rear die holder 77 has a bushing 94 in registry therewith. The plurality of punches or other working tools 80, being attached to the tool holder 130, are operated simultaneously forwardly and rearwardly, or to the right and left respectively, as shown in Fig. 3. On the forward movement of the crosshead 124, the punches or other operating tools 80 slide in the bushings 79, into and through the bushings 94 in the dial plate 81, forcing the billets or slugs 153 therein, into the dies or other forming tools 190, 191, and in which dies or forming tools the actual cold working of the metal takes place.

After the operations have been completed and the punches or other working tools 80 move to the left, as viewed in Fig. 3, billets or slugs 153 upon which work has been performed, are removed from the dies or other mechanism 190, 191 and reinserted in the respective bushings 94 in the dial plate 81.

This latter operation is performed by devices attached to and carried by the tool holder 71, and which toolholder is in turn operated by the crossheads 61 and 65. It should be understood of course, that the various cams on the main or drive shaft 15 which operate the crosshead 124 and the crosshead 61 are so designed and arranged as to permit the proper movement of the crossheads to allow the proper operation of the tools above referred to.

The first operation consists in roughly forming, from the billet or slug 153, the shank and body of a bead chain element. Therefore, as the slug 153 is cut off from the bar or rod 152 and moved into registry with the perforation of the sleeve 94 of the dial plate 81, such slug on the rearward movement of the crosshead 61 will be moved into a bushing 94 as shown in Fig. 11.

On the next forward movement of the crosshead 124 the dial plate 81 will be moved about its axis through the space of one ratchet tooth 95 in a counter-clockwise direction, as shown in Fig. 8, or into the position designated as the number two position. This is the idle position and no operation is performed on the billet 153 at this stage. On the next cycle of movement of the mechanism another billet 153 will be placed in the next succeeding bushing 94 and afterwards the first bushing 94 will be moved into the number three position.

The next movement will result in such bushing 94 being moved to the number four, or again the idle position. The next cycle will move such bushing into the number five working stage position, the next cycle will move the billet into the number six, or idle position, and the next cycle will move the bushing 94 into the number seven, or assembling stage, or final position.

Immediately the bushing 94 comes into the number three position and on the forward movement of the crosshead 124 the forming punch 80 as shown in Fig 12, will move the billet or slug 153 out of the bushing 94 and into the forming die 190. Such die 190 has a longitudinal perforation 192 extending therethrough and on its front end is cupped to approximately the outer contour of the head of the article to be formed. The forming punch 80 therefore will force the slug or billet into the cup end of the die 190, roughly forming the cup or ball and forcing the excess of metal into the longitudinal perforation 192.

The forming punch 80 having completed its operation, will then start to move in the direction of the arrow shown in Fig. 12. Simultaneously therewith, the crosshead 61 begins to move to the left, or in the direction of the arrow shown adjacent such element, and such crosshead carries a cylindrical holder 193 having secured to its front end, and in the axis thereof, an extruding punch 194 of a diameter slightly less than the diameter of the perforation 192 in the die 190. The extruding punch 194 contacting with the end of the shank formed on the billet or slug 153, will force the billet or slug 153 out of the die 190, and will move the same into the dot and dash position, as shown within the bushing 94 in Fig. 12.

The punch 80, and the extruding punch 194, having completed their movement to the left, will start on their movement again to the right on the next cycle, and as the extruding punch 194 engages the right hand face of the dial plate 81, the mechanism is operated to rotate the dial plate 81 in a counterclockwise direction through the space of one ratchet tooth 95. As the forward movement of the crosshead 124 continues on this second cycle, the forming punch 80 will operate this time on the next succeeding billet or slug 153, but the first billet or slug 153 being in the number three, or idle position, will have no work performed thereon.

On the next succeeding cycle, the third billet or slug 153 will have the first operation performed thereon and the second billet or slug will now be in the number three or idle position. The first billet or slug 153 however, being now in the fourth position, will have an operation performed thereon, and this is illustrated in Figs. 13, 14 and 15.

*Heading operation*

Referring to such figures, the punch 80 which may be the same as, or similar to, the punch shown in Fig. 12, forces the formed billet or slug 153 out of the bushing 94 in the dial plate 81 and into the header tool designated by the reference numeral 191.

The heading operation is shown as taking place in Figs. 13, 14 and 15, and referring to such figures, the heading die 191 comprises a chamber 195, formed in the head of the die, in which is slidably mounted a substantially cylindrical block 196. The block 196 has formed therein, on its front end, the vertical slots 197, through which and through the body of the block 196, extend the shafts 198. Pivotally mounted on the shafts 198 are the holding jaws 199, which cooperate to firmly grip and hold the shank formed on the cold worked article, formed from the billet 153, as clearly shown in Fig. 15. At the rear of the sliding block 196 is formed a cylindrical recess 200, in which is slidably mounted a disc 201, provided with a centrally located perforation, the rear portion of which is dished or formed on the contour of the outer portion of the formed head of the article, adjacent the connection of such formed head with the shank thereof, as clearly shown in Fig. 13.

The cylindrical body 196 is counterbored at its front end, as indicated by the reference numeral 202 and houses a coil spring 203, the coil spring 203 being thus housed between the bottom of the counterbore portion 202 and the bottom of the recess in which fits the body of the heading die 191. The front die holder 51 has a cylindrical chamber 204 formed therein, in which is slidably mounted the cylindrical member 205, at the rear end of which is integrally formed a rearwardly extending heading punch 206. This punch is slidable axially in a perforation extending through the axis of the slidable cylindrical block 196.

At the front end of the cylindrical member 205 and formed integral therewith, is a shaft 207, which is slidably mounted in a suitable perforation in the front die holder 51. This shaft 207 extends outwardly and forwardly beyond the limit of the front die holder 51, and at its front end has secured thereto a head 208, provided on its inner or rear face with a plurality of depressions 209, adapted to receive one end of coil springs 210. The other or rear end of such springs seat in depressions 211 formed in the front face of the front die holder 51. Surrounding the shaft 207, between the front face of the front die holder 51 and the rear face of the head 208, is another coil spring 212, this assembly of springs 210 and 212 urging the shaft 207 and therefore the heading punch 206, to the right, as shown in Fig. 13, thus ordinarily maintaining the heading punch 206 in the position shown in Fig. 13.

Mounted on the rear face of the tool holder 71, is an adjustable screw-threaded plunger 213, which upon rearward movement of the crosshead 61 engages with the end of the shaft 207, and moves such shaft, and therefore the heading punch 206, to the left, as shown in Figs. 13 and 14, and into the position shown in Fig. 14, against the tension of the springs 210 and 212. Such springs 210 and 212 immediately return the shaft 207, and therefore the heading punch 206, from the position shown in Fig. 14 to that shown in Fig. 13, upon retraction of the adjustable plunger 213. Fig. 15 is a section on the line 15—15 of Fig. 13, and shows the jaws 199 gripping the shank.

The normal operation of the structure, shown in Figs. 13, 14 and 15, is as follows: The pivoted holding jaws 199 and the disc 201, are normally in the position shown in Fig. 14, as is also the sliding block 196. The heading punch 206 is normally in the position shown in Fig. 13, with the cylindrical member 205 in engagement with the bottom of the recess 204 in the front die holder 51.

Assuming the dial plate 81 to have been rotated in a clockwise direction, so as to bring the formed article shown in the dot and dash position in Fig. 12, to a position in alignment with the punch 80, shown in Fig. 13, and the main or drive shaft 15 being in rotation, the crosshead 124 will move forward, bringing the punch 80 therewith, and such punch will move the formed billet or slug 153 from the bushing 94 in the dial plate 81, and force the same through the perforation in the disc 201.

The engagement of the rounded end of the body of the formed article, engaging with the cupped depression in the rear face of the disc 201, the disc 201 will be moved to the right from the position shown in Fig. 14, thereby rotating the holding jaws about their respective shafts 198, until same assume the position shown in Fig. 13. Continuation of the forward movement of the punch 80 will force the end of the shank of the formed element into association with the end of the heading punch 206, and a head will be formed thereon, as shown in Fig. 13. The spring 203 will be compressed as the head is formed, and the cylindrical member 196 will move from the position shown in Fig. 14, into its final position, as shown in Fig. 13. The head is now formed.

As the main or drive shaft 15 rotates, the crosshead 124 will move rearwardly, withdrawing the punch 80 from the position shown in Fig. 13, and such punch moves to the left in such figure. The crosshead 61, carrying the adjustable plunger 213, moves such adjustable plunger to the left, from the position shown in Fig. 13, to that shown in Fig. 14, where, it will be noted that the cylindrical member 205 has moved to the left from the position shown in Fig. 13, until it engages with the bottom of the counterbore portion 202 in the front face of the sliding member 196, with the result that the heading punch 206 forces the headed article to the left, opening the holding jaws 199, and placing the headed article in the bushing 94 in the dial plate 81, preparatory to moving such article to the next operative stage. As the crosshead 61 moves to the right, carrying with it the adjustable plunger 213, the springs 210 and 212 retract the shaft 207 and all parts attached thereto, to the normal or inoperative position shown in Fig. 13.

*Article reversing operation*

On the next rotary step of the dial plate 81, to bring the same into position, shown in Figs. 16, 17 and 18, the cold worked element produced from the billet or slug 153, is in position to have the mechanism operate upon the same to reverse the position of such finished article with respect to the dial plate 81, preparatory to arranging the same as one of the elements of a bead chain.

Referring to Figs. 16, 17 and 18, the front die holder 51, has arranged therein, and on the rear face thereof, a block 214, having extending therethrough, a passage 215, in alignment with, and of substantially the same diameter as, the perforation in bushing 94, carried by the dial plate 81. The block 214 is machined to provide a bearing for a cylindrical member 216. Such member 216 has its axis perpendicular to the axis of the passage 215 in the block 214. The rotatable cylindrical member 216 has a transverse passage 217 extending therethrough, and of a diameter equal to the diameter of the passage 215 in the block 214. Formed on the cylindrical member 216, adjacent to one end thereof, is a pinion 218.

The front face of the front die holder 51 is cut away adjacent to the front end of the block 214, to form a recess 219. Arranged in the material of the front die holder 51, within the recess 219, is a stub shaft 220, on which is rotatably mounted a gear segment 221, which meshes with and drives the pinion 218. Secured to the rear face of the front die holder 51, by screws 222, is a vertically arranged slideway 223. Slidably mounted in the slideway 223, is a member 224 having formed integral therewith and at its lower end, a projection 225, provided with a horizontal elongated slot 226. Secured to, or formed integral with, the gear segment 221 and extending radially outward from the shaft 220 on the side opposite such gear segment, is a lever arm 227, provided at its free end with a pin 228, working in the elongated slot 226.

Formed integral with the member 224 and extending outwardly therefrom, and from the face of the front die holder 51, is an arm 229, having secured to its outer end a stub shaft 230, on which is rotatably mounted a cam roller 231. The crosshead 61, at a point opposite the end of the arm 229, is slotted, as indicated by the reference numeral 232, and to one of the side walls of such slot, is attached, by screws 234, cam inserts 235, which define between them, when they are in position, a cam race 233, in which rolls the roller 231.

The construction of this cam race 233 is clearly shown in Fig. 16, and from this figure, it will be obvious that, as the crosshead 61 is moved to the left, as viewed in such figure, the cam race 233 will cause the roller 231 to ride downwardly therein, and consequently will cause the arm 229 and the member 224 to likewise ride downward, thus rotating the gear segment 221 and moving such gear segment from the position shown in Fig. 16, to the position shown in Fig. 17. The pinion 218 and the gear segment 221 are so proportioned that the rotation of the gear segment 221 from the position shown in Fig. 16 to that shown in Fig. 17, will cause a rotation of the pinion 218 and therefore the cylindrical member 216 through an angle of 180 degrees. It is obvious therefore that the punch 80, shown in Fig. 16, when the machine is in operation, will push the cold worked billet or slug 153 from its position within the bushing 94 in the dial plate 81 into the passage 217 in the cylindrical member 216 and into the position shown in Fig. 16. As the main or drive shaft 15 rotates, the punch 80 will be retracted, and the crosshead 61 will move to the left and will cause, as above described, a rotative movement of the cylindrical member 216 through 180 degrees, rotating the same from the position shown in Fig. 16 to that shown in Fig. 17, where it is obvious that the position of the finished article made from the billet or slug 153 with respect to its original position is reversed. During the latter part of the movement to the left of the crosshead 61, the gear segment 221 is kept stationary and at this moment the knockout punch 236 carried by the crosshead 61, moves into the passages 215 and 217 and forces the completed article made from the billet or slug 153 from the cylindrical member 216 back into the bushing 94 in the dial plate 81.

In the particular article being manufactured, it was found preferable to assemble the various bead chain units in a particular manner and this particular manner called for positioning the elements for assembly into a chain in a direction opposite to that in which the same were manufactured. In a number of articles, and particularly articles in which it is not desired to connect seriatim, this operation just described would not be necessary. Such operation is described as it shows the versatility of the machine.

The operation of assembling the various elements into a bead chain form will now be described, and in such description reference is made to Figs. 19 to 24 inclusive, where the various mechanisms employed, and the various steps performed by such mechanism, are clearly illustrated. reference has been made above to the completed article made from the billet or slug 153. Such term is a convenient one, but is not strictly correct, as in assembling the various elements, it is necessary to perform an additional operation on each element before such element can be considered as complete. This operation consists of changing the form of the bead from a cylindrical to a globular one.

Connecting the articles seriatim

Figure 20:
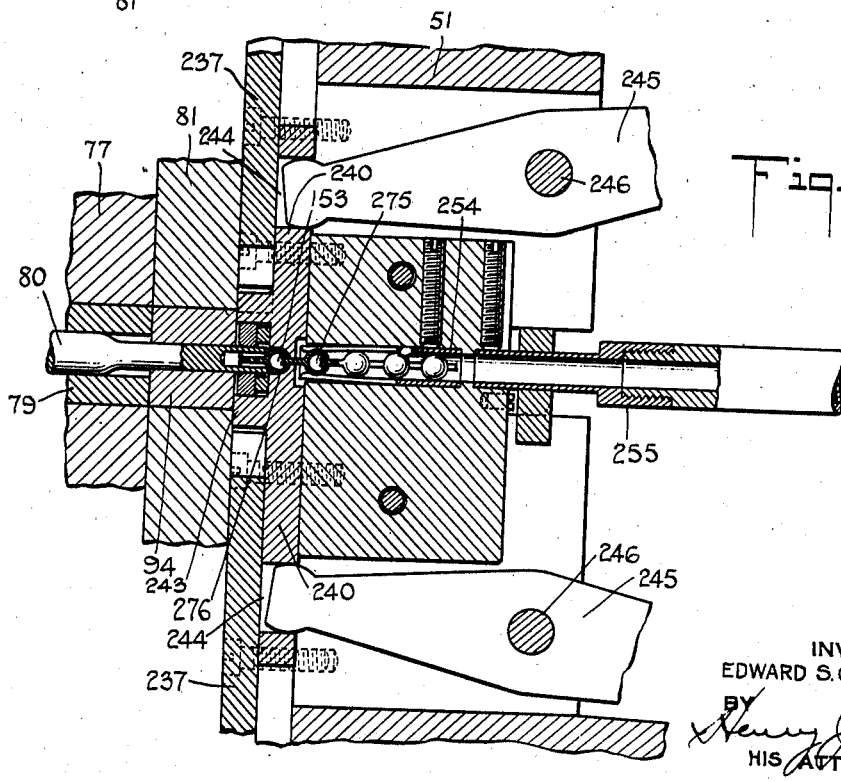
Fig. 20 is a sectional elevation, similar to Fig. 19, but on a plane parallel thereto and passing through the center of the finished article discharging tube, and showing the closing jaws for serially connecting the hollow end of one of the duplicate products to the headed end of a proceeding duplicate product, the closing jaws being shown in closed position.

The reversing operation having taken place as above described and the main or drive shaft 15 being assumed to be in rotation, the dial plate 81 is advanced in a counterclockwise direction by intermittent steps, and is brought to rest in the position shown in Figs. 19 to 21 inclusive, with the bushing 94 carrying the reversed element in position opposite the mechanism employed in completing the shape of the head and attaching said element to the next preceding element, and moving the same through a tube to be discharged from the machine.

Referring to such Figs. 19 to 24 inclusive, the front die holder 51 is cut away or formed to receive the appropriate mechanism for carrying out this step in the formation of the improved article. The rear face of the front die holder 51 has inserted therein, so as to be flush therewith, a steel plate 237 arranged to form a vertical guideway, as shown in Fig. 22. The plate 237 is spaced from the portion of the front die holder 51 immediately in front thereof to provide a slideway 239, see Fig. 21, in which is slidably mounted the jaws 240, there being two of such jaws, one at each end of the slideway 239, and which jaws work toward and from each other. The jaws 240 when in operated and forming position have their abutting edges meeting and such abutting edges are shown in Fig. 22, and are indicated by the reference numeral 241. Such abutting edges, in the central portion thereof, are machined as indicated at 242 to the desired form of the open end of the body portion of the article to be formed.

On the front face of the jaws 240 are rearwardly projecting members 243, which, when the jaws are in closing position, engage with and hold open a pair of holding jaws for the shank of the article to be formed, as will be hereinafter described. The machined portions 242 in the closing jaws 240, when the edges 241 are in abutting position, make a cup and orifice which lie in the axis of the bushing 94 in the dial plate 81 so that as the punch 80 carried by the crosshead 124 moves to the right, as viewed in Fig. 21, such punch will engage with the head portion of the article formed from the billet or slug 153, and will force the same into close association with the machined portions 242 thus rounding over the open end of the body portion of the article formed.

If at the time the punch 80 is moving the element 153 to the right, as viewed in Fig. 20, the shank of a preceding element 153 is held as shown in Fig. 20, it is obvious that the head of the succeeding element 153 will be coupled to the shank of the preceding element 153.

Each of the slide elements 240 has a transverse slot 244 therein, in each of which works one end of a lever 245, these levers being rotatably mounted on shafts 246, secured to the front die holder 51. The levers 245 extend forwardly or to the right as shown in Figs. 19 to 21 inclusive, and at their forward or righthand end have a cam element 247 formed integral therewith. These cam elements 247 are adapted to be engaged by a hardened steel cam member 248 carried by the reciprocal block 71. The cam ends 247 of the cam levers 245 are constantly urged inwardly toward each other, the top one by the spring pressed plunger 249 and the bottom one by the spring pressed plunger 250. The inner surface of the levers 245 adjacent to the cam end 247 are recessed as indicated by the reference numeral 251 and in such recess is a shaft 252 on which is rotatably mounted a spring pressed cam insert 253.

These inserts 253 are adapted to be engaged by the hardened steel inserts 248 in the manner, and for a purpose, to be hereinafter described.

The front die holder 51 is provided with a passage in the axis of the bushing 94 in the dial plate 81, and in this passage is secured a spring chuck 254. Also secured in the front end of such passage is one end of a discharge tube 255, and which discharge tube is in alignment with a groove 256 in the top end of a bracket 257 secured to the front face of the front die holder 51 by screws 258.

In the block which contains the spring chuck 254 is slidably mounted in the parallelly arranged shafts 259, such shafts having secured at their forward ends a crossbar 260, and one end of this crossbar extends out beyond the limit of the block referred to. The rear ends of the shafts 259, are rotatably mounted in a plate 263, the connection between the shafts 259 and plate 263 being such that while the shafts 259 are rotatable with respect to the plate 263, they are incapable of axial movement with respect thereto. Secured to the rear ends of the shafts 259 so as to be rotatable therewith, are the holding jaws 261. The holding jaws are constructed as shown in Fig. 24, and when in holding position, the jaws cooperate to firmly hold the shank of the article therebetween. The inward movement of the holding jaws is limited by the pins 262, secured to the face of the plate 263. Projections 264 at opposite diagonal corners of the plate 263 act as supports for coil springs 265 which constantly urge the holding jaws 261 toward each other in holding position.

Formed integral with the jaws 261 are projections 266 which, when the jaws are in holding position, as shown in Fig. 24, project slightly above and below the upper and lower edges respectively of the plate 263. Such projections 266 are adapted to be engaged by the rearwardly projecting portions 243 on the sliding member 240, as shown in Fig. 20, for example, where, upon such engagement, the holding jaws 261 will be separated sufficiently to allow the punch 80, as shown in Fig. 20, to pass therethrough and to simultaneously force therethrough an article constructed from a billet or slug 153, and to force such article into engagement with the machined portions 242 of the sliding members 240, and thus complete the formation of the head of the article and the attachment thereof to the shank of the preceding article.

The outwardly projecting portion of the crossbar 260 is located in the forked end 267 of a lever 268, pivoted at 269 to the outer face of the block in which is mounted the shafts 259. The end of the lever 268, remote from the forked end 267, is provided with a laterally extending pin 270, which works in a slot 271, formed in a cam lever 272. Secured to the reciprocal block 71 is a pin 273 which, in the movement of said crosshead to the left, as viewed in Fig. 19, is adapted to engage with the free end of the cam 272. The engagement of the pin 273 with the cam 272 will cause a rotative movement of the said cam in a counterclockwise direction, as viewed in Fig. 19, and therefore, a rotative movement of the forked end 267 of the lever 268 in a clockwise direction, thereby moving the shafts 259 to the right, as viewed in Fig. 23, and thereby moving the holding jaws 261 from the full line position shown in Fig. 21, to the dot-and-dash position shown in such figure.

Secured to the reciprocal block 71 and extending downwardly into the path of rotation of the lever 272 is a pin 274, and the position of such pin with respect to the pin 273 and with respect to the rotative movement of the lever 272, is such that pin 274 will be moved into a position to the left of the free end of the lever 272, when such lever is rotated in a counterclockwise direction. Therefore on the sliding movement of the crosshead 61 to the right, the lower end of the pin 274 will engage with the free end of the lever 272, rotating such lever in a clockwise direction with a resultant counterclockwise rotative movement of the forked end 267 of the lever 268, and therefore a movement of the shafts 259 and holding jaws 261 to the left, as viewed in Fig. 23, or resulting in a movement of the holding jaws 261 from the dot-and-dash position shown in Fig. 21 to the full line position shown in such figure.

The operation of the mechanism illustrated in Figs. 19 to 24 inclusive, and described above, is as follows: It will be assumed that the machine has been in operation and that therefore a number of articles have been completed, and have been connected seriatim, and are located in the spring chuck 254, and in the discharge tube 255, and that the last article operated on is now held in the jaws of the spring chuck 254. For convenience such last article is designated by the reference numeral 275. The next succeeding article in the complete form is brought into proper position by the dial plate 81 and such article is designated for convenience by the reference numeral 276.

The crosshead 124 moves to the right with respect to Figs. 19 to 21, and also simultaneously therewith the crosshead 61 moves to the right. The punch 80 passing through the rear die holder 77 enters the bushing 94 in dial plate 81, and moves the article 276 to the right as viewed in Fig. 21. Before the article 276 is moved out of the bushing 94, the crosshead 61 will have assumed the position shown in Fig. 19, thereby rotating the levers 245 so as to bring the jaws 240 into engagement with each other, and gripping the shank of the article 275 therebetween, as clearly shown in Fig. 20, and closing the machined portions 243 preparatory to receiving the open end of the body of the article 276. As the sliding jaws 240 come into engagement with each other, the projections 243 on the rear face thereof, engage with the projections 266 on the holding jaws 261, thereby moving the jaws out of association with each other, and preparing an opening through which freely passes the article 276 and the forming punch 80. The punch 80 moves the article 276 to the right, forcing the same into the machined portions 242, and thus completing the formation of the head of such article 276, and interconnecting such article with the preceding article 275.

The interconnection of the elements having been accomplished, the crosshead 124 and the crosshead 61 start on their movement to the left with respect to the Figs. 19 and 21 inclusive. The forming punch 80 moves to the left and assumes the position shown in Fig. 21. The hardened steel portions 248 in the crosshead 61 ride off the cam projections 247, and permit the levers 245 to rotate from the position shown in Figs. 19 and 20 to the position shown in Fig. 21, where it will be obvious that the sliding jaws 240 are removed from the article 276. As the jaws 240 separate from each other, the springs 265 force the clamping jaws 261 into clamping position with respect to the shank of the article 276, so that such article is now held in the position in Fig. 21. As the crosshead 61 moves to the left Fig. 21. As the crosshead 61 moves to the left with respect to the showing in Fig. 19, the pin 273 engages with the free end of the lever 272, rotating the same in a counterclockwise direction and causing a sliding movement of the shafts 259, and therefore the holding jaws 261, to the right as viewed in Figs. 23 and 21, and moving the article 276 from the position shown in Fig. 21 to the right, thus displacing the preceding article 275 from the spring chuck 254, and substituting the article 276 therefor.

The crosshead 61 now occupies a position as indicated in Fig. 21, and upon the starting of the movement of the crosshead 61 to the right, the hardened steel members 248 carried by such crosshead, engage with the spring pressed cam inserts 253 and rotate the levers 245 a slight distance so as to bring the cooperating edges of the sliding members 240 into engagement with the projections 266 on the holding jaws 261, thus moving the said holding jaws out of engagement with each other and freeing the same from the shank of the article 276.

Simultaneously with this opening movement, the lower end of the pin 274 engages with the free end of the lever 272, rotating the same in a clockwise direction and causing a movement of the shafts 259, and holding jaws 261, from the dot-and-dash position shown in Fig. 21 to the full line position shown in Fig. 23.

The engagement of the hardened steel inserts 248 with the spring pressed cam inserts 253 is maintained long enough for the above described operation to take place, and as the crosshead 61 continues its movement to the right, the spring pressed cam inserts shown in such Fig. 21, will be rotated in a clockwise direction about their shaft 252, allowing the sliding members 240 to move away from each other. This position of cross-sliding members 240 will continue until the crosshead 61 moves to the right and the inserts 248 engage with the cam ends 247, when the sliding members 240 are brought into engagement with each other, or into the position shown in Fig. 20, preparatory to the operation of another complete cycle.

The various operations above described all take place simultaneously so that if an article to be formed requires four operations for example, all such four operations are being performed simultaneously on four separate and distinct articles. The various operations however are performed in succession and in the proper order on each article. The articles are made from a billet or slug, and while in the article used as an illustration no waste of material takes place, yet it is conceivable that in practicing my invention a certain amount of waste or scrap may be produced, but such amount of scrap is exceedingly small as compared to machining operations for similar articles that my present machine is capable of producing.

The embodiment of my invention above described is for illustrative purposes and while I have necessarily shown and described such embodiment in detail, it is to be understood that I am not to be limited to the exact construction shown but may vary the size, shape and arrangement of parts comprising my improved device within relatively wide limits without departing from the spirit of the invention.

From the above, it appears that my invention is directed to the production by cold working of a billet or slug, desirably originally of solid wire or rod-like formation of cylindrical or other suitable outer configuration. The composition of the material of such wire—and the billets or slugs cut therefrom—is such as to enable the successive stages of treatment to be readily carried out and, further, that the material acquires in the course of the successive treatments physical characteristics, inter alia, condensed grain structure, increased tensile strength, resistance against bending, against torsion or other flexure, to qualify the material of the resulting product to withstand stresses and strains incident in use, and in certain instances, immunity against chemical and other corrosion.

My invention is particularly directed to the production of articles provided with a socket, or other cavity the wall of which extends about a complete periphery. Such cavity, mayhap, may extend, for certain types of product completely through the product, to serve in such instances as a bore through the same.

Characteristics of products produced by my machine, applicable to partially or wholly extending cavities, reside in the product having a transverse dimension exceeding the corresponding transverse dimension of the billet or slug from which it was formed, and in many instances also having a length exceeding that of the billet or slug from which it was formed.

Advantageously, the successive stages of treatment requiring variant extents of relative movements of the male dies and associated female dies for variant types of products, are had by employing crossheads or equivalent means operated over uniform extent of relative displacement, the precise range of relative movement of any particular male die and its associated female die being attained by individual adjustment.

I claim:

1. A machine comprising, in combination, a stationary die holder, a plurality of operation stations formed in said die holder, die means for configurating metal slugs arranged in said stations, a freely rotatable carrier arranged to move said metal slugs from one operating station to another in succession, means for rotating said carrier in step by step movement, means operated in common with said carrier rotation means for cutting a succession of said metal slugs and individually inserting said slugs into a station in said carrier, means independent of said carrier drive means for positively positioning said carrier after the movement thereof, metal working tools carried by a reciprocating cross head movable toward and from said stationary die holder and arranged, during the reciprocation of said cross head, to move a slug out of the carrier and into said die means, a second reciprocating cross head, and means carried thereby for moving the worked upon metal slug out of said die means returning the said slug to the same station of said material carrier.

2. A machine comprising in combination, a stationary die holder, a plurality of operating stations arranged in one face thereof, a dial plate freely rotatably mounted on one face of the stationary die holder and associated with the operating stations, means for cutting a metal slug, means in said dial plate for receiving said slug, means for intermittently rotating the dial plate to bring the slug successively into operative relation with the operating stations, gaging means movable through said dial plate for establishing said operative relationship, punches movable through the dial plate to thereby force the slug out of the dial plate into the operating stations to be worked upon, and means for removing the worked upon slug from the operating stations and repositioning the same within the dial plate at the previously occupied stations thereof.

3. In a machine, a combination of a stationary member, a plurality of operating stations formed in one face of said member, die means for configurating metal arranged at each of said stations, each of said stations adapted to perform a separate and distinct operation on a slug of metal, means for cutting a slug of metal from an indeterminate metal length, a rotatable slug carrier adjacent said stationary member and arranged to be intermittently moved to bring the slug successively into operative position with respect to the operating stations, means for inserting said slug into a station of said slug carrier during a period of quiescence thereof, reciprocal tool carrying means arranged for movement toward and from said stationary member and said slug carrier, a plurality of tools for cold working metal associated with the plurality of operating stations and arranged to move the slug from said carrier into said operating stations, means for removing the worked upon slug from the working stations after the working thereof and returning the same to the same carrier station, a gaging pin operated by one of said tool-carrying means for positively establishing the position of said slug carrier after the movement thereof, and means for operating the working tools and slug replacing device in synchronism.

4. In a machine, the combination with a slug forming device, an intermittently movable slug carrying device, means for moving the plurality of slugs from the slug forming device to the slug carrying device, a plurality of forming stations for cold working the slugs in groups to produce an article, said article maintaining relatively fixed position within the carrying device during its travel through the machine, means for reversing the position of said articles in the machine, and means for interconnecting said articles seriatim, at the discharge end of the machine.

5. In a machine, the combination with means for forming a plurality of articles in succession from slugs of metal by cold working the same, said articles comprising essentially a hollow open head portion and a shank, means for forming a head on the end of the shank, means for reversing the position of one of said articles, means for holding said reversed article, and means for completing the formation of a hollow head on the end of said reversed article and simultaneously engaging the headed end of the shank of the immediately previously formed article.

6. In a machine, the combination of a main drive shaft, two cross heads associated therewith and driven thereby as a unit, tools for cold working metal carried by said cross heads, said tools being arranged in groups, one group on one cross head and the other group on the other cross head, the tools of one group advancing while the other group is retreating, a stationary die holder located between said groups of tools, means for moving said groups of tools alternately into operative engagement with the tools in the stationary die holder, each tool of each group performing a different cold working operation on a slug, a freely rotatable slug carrying mechanism associated with said stationary die holder, means for cutting individual slugs from an indeterminate length of material and inserting said slugs successively into operating stations of said slug carrying mechanism, means for intermittently moving said slug carrying mechanism to carry the slugs from one set of tools to the other, and means associated with one of said cross heads for gaging the amount of movement of said slug carrying mechanism.

EDWARD S. CORNELL, Jr.